(12) United States Patent
Takeshita et al.

(10) Patent No.: US 6,899,323 B2
(45) Date of Patent: May 31, 2005

(54) VIBRATION-ISOLATING BUSHING

(75) Inventors: Seiya Takeshita, Osaka (JP); Yasukuni Wakita, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/647,694

(22) Filed: Aug. 25, 2003

(65) Prior Publication Data
US 2004/0046298 A1 Mar. 11, 2004

Related U.S. Application Data

(63) Continuation of application No. 10/237,301, filed on Sep. 5, 2002, now abandoned.

(51) Int. Cl.⁷ ................................................. F16F 13/00
(52) U.S. Cl. ................................ 267/140.12; 267/140.3
(58) Field of Search .................... 267/140.11, 140.12, 267/140.3, 140.4, 140.5, 141, 141.2

(56) References Cited

U.S. PATENT DOCUMENTS

| | | | |
|---|---|---|---|
| 3,572,677 A | 3/1971 | Damon | |
| 3,584,857 A | 6/1971 | Hipsher | |
| 3,976,338 A | 8/1976 | Trachte et al. | |
| 4,002,327 A | 1/1977 | Damon | |
| 4,083,545 A | 4/1978 | Herbenar | |
| 5,190,269 A | * 3/1993 | Ikeda et al. | 267/140.12 |
| 5,224,790 A | * 7/1993 | Hein | 403/225 |
| 5,702,094 A | 12/1997 | McLelland et al. | |
| 5,820,115 A | 10/1998 | Stevenson et al. | |
| 5,887,859 A | 3/1999 | Hadano et al. | |
| 5,915,762 A | * 6/1999 | Wakabayashi et al. | 29/888.09 |
| 6,450,487 B1 | * 9/2002 | Kuwayama | 267/141 |
| 6,517,062 B2 | 2/2003 | Kuwayama et al. | |

FOREIGN PATENT DOCUMENTS

| | | |
|---|---|---|
| JP | 2-60731 | 5/1990 |
| JP | 3-12029 | 2/1991 |
| JP | 5-64544 | 8/1993 |
| JP | 6-76729 | 10/1994 |
| JP | 6-300066 | 10/1994 |

* cited by examiner

*Primary Examiner*—Robert A. Siconolfi
*Assistant Examiner*—Devon Kramer
(74) *Attorney, Agent, or Firm*—Knobbe Martens Olson & Bear, LLP

(57) ABSTRACT

In a so-called bulge type of vibration-isolating bushing wherein an annular cover made of a synthetic resin is provided as a bulge portion on an outer periphery of an axially central part of an inner cylinder, such a vibration-isolating bushing that is superior in buckling strength in the axial direction of the inner cylinder, low-cost, and advantageous in environmental aspect, while preventing any displacement of the annular cover is provided. To that end, a knurling is provided on an outer periphery of an axially central part of a metal pipe constituting the inner cylinder, preferably, together with a serration on an axial edge of the metal pipe; and the annular cover is secured to the outer periphery of the metal pipe inclusive of the knurling by molding of a synthetic resin.

8 Claims, 3 Drawing Sheets

VIBRATION-ISOLATING BUSHING

This is a continuation of U.S. application Ser. No. 10/237,301 filed Sep. 5, 2002 now abandoned, and the complete disclosure of which is hereby incorporated by this reference.

BACKGROUND OF THE INVENTION

1. Field of the Invention

This invention relates to a vibration-isolating bushing, for example, for use in an automobile, in part of a suspension mechanism of which it is incorporated to alleviate vibrations.

2. Description of the Related Art

In automotive vehicles, with a view to controlling vibrations transmitted from the wheel side to the automotive body side or vibrations transmitted from the engine side to the body side, a vibration-isolating bushing is generally incorporated in part of a suspension mechanism or an engine support mechanism. One example of such vibration-isolating bushings is a so-called bulge type of vibration-isolating bushing, which is provided with a bulge portion bulging out in an axially square direction in an axially central area of an inner cylinder so as to lower the spring constant in a prying direction while heightening the spring constant in the axially square direction.

FIG. 6 illustrates an example of a conventional bulge bushing. This vibration-isolating bushing is composed of an inner cylinder 102 made of metal provided with a bulge portion 101 bulging out in an axially square direction in an axially central part thereof, an outer cylinder 103 encircling the inner cylinder, and a rubber-like elastomer 104 interposed between both cylinders 102, 103. Due to the bulge portion 101, the rubber-like elastomer 104 is made thinner in its axially central part than in its both ends, whereby the spring constant in the axially square direction A (an orthogonal direction to the axial direction) is set to be larger and the spring constant in a prying direction B (a direction in which center axes of the inner and outer cylinders 102, 103 slant relatively) is set to be smaller. Thereby a compromise or trade-off between an improvement in riding comfort and an enhancement in steering stability is contemplated.

In the known vibration-insulating bushing shown in FIG. 6, the bulge portion 101 of the inner cylinder 101 is integrally formed by forging. This renders the processing cost high and causes the product weight to increase. Further when forging, it is difficult to make the outside diameter of the bulge portion large beyond a definite size by forming and consequently, the degree of freedom in design between the spring constant in the axially square direction and the spring constant in the prying direction is low.

It is therefore proposed to fashion the bulge portion by an annular cover made of a synthetic resin. Such a vibration-isolating bushing is proposed in JP Utility Model Laid-Open Publication 5-64544 (1993) as shown in FIG. 7, wherein the annular cover 112 made of a synthetic resin is provided rigidly as a bulge portion on the outer periphery of an inner cylinder 110 at its central area, and a rubber-like elastomer is interposed between the inner cylinder 110 and an outer cylinder 114 so as to sheathe the annular cover 112. When the annular cover 112 is provided on the outer periphery of the inner cylinder 110 in this way, at the time of molding the rubber-like elastomer 116 by vulcanization, the annular cover 112 can be displaced owing to its heat and pressure. Consequently, the aforementioned Publication discloses that as a stop for disconnection or detachment of the annular cover 112, two to four recesses 118 are circumferentially defined on the outer periphery of the inner cylinder 110 and filled with a part of the synthetic resin or the disconnection stop is inversely provided in a projecting manner, thereby securing the annular cover 112.

Again, JP Utility Model Laid-Open Publication 6-76729 (1994) discloses that in order to prevent the displacement of the annular cover 112 in the axial direction or a rotational direction, a plurality of seating faces 120 each having a length close to the breadth of the annular cover 112 and a flat bottom are circumferentially recessed, as illustrated in FIG. 8, on the outer periphery of the axially central part of the inner cylinder 110 and upon molding of the annular cover 112, a synthetic resin is flowed into the seating faces 120 thereby to seat and secure the annular cover 112 on the seating faces 120.

With these vibration-isolating bushings as illustrated in FIGS. 7 and 8, a plurality of recesses, which are to some degree large, are thus provided on the inner cylinder for the prevention of displacement of the annular cover, as a result of which the buckling strength of the inner cylinder in the axial direction to loads comes to decline. Further the conventional displacement preventive structures as exemplified in FIGS. 7 and 8 are low-cost as compared to the case of forging in FIG. 6, yet necessitate more or less several steps for molding and a further cost cutting is therefore required. Moreover, cutting wastage is produced by the provision of the recess portions and an improvement from an environmental aspect is also required, accordingly.

SUMMARY OF THE INVENTION

In the light of the problems above in the so-called bulge type of vibration-isolating bushings, the present invention is aimed at, while preventing the displacement of an annular cover of a synthetic resin provided as a bulge portion on a surface of an inner cylinder, providing such a vibration-isolating bushing that is superior in buckling strength of the inner cylinder in the axial direction, low-cost, and superior in environmental characteristic.

The vibration-isolating bushing according to this invention comprises an inner cylinder having a bulge portion bulging out in an axially square direction in an axially central part thereof, an outer cylinder disposed outside of the inner cylinder in a spaced relation, and a rubber-like elastomer interposed between the inner cylinder and the outer cylinder. In that bushing, the inner cylinder is composed of a metal pipe and an annular cover constituting the bulge portion provided on an outer periphery of an axially central part of the metal pipe; the metal pipe has a knurling provided on the outer periphery of the axially central area thereof; the aforementioned cover is secured to the outer periphery of the metal pipe inclusive of the knurling by molding of a synthetic resin; the rubber-like elastomer is vulcanization molded to the inner cylinder at its outer periphery in a manner enwrapping or sheathing the aforementioned cover therein.

With the vibration-isolating bushing of this invention, on the outer periphery of the inner cylinder there is formed the knurling, on the surface of which the annular cover as a bulge portion is provided by molding of a synthetic resin. Because of this structure, the synthetic resin intrudes within fine mesh-like furrows of the knurling and the annular cover is strongly anchored to the outer periphery of the inner cylinder. As a consequence, any displacement of the annular cover in the axial and rotational directions upon vulcanization molding of the rubber-like elastomer is prevented.

Further, the knurling (knurls) can be provided by a simple method of urging a cylindrical knurling tool having on its outer periphery notches toward the workpiece under rolling and hence, the bushing is low-cost and advantageous also in an environmental aspect since no cutting wastage is produced.

In the vibration-isolating bushing according to this invention, it is preferred that the metal pipe constituting the inner cylinder be provided at least at one axial edge face with a serration and further hardened by quenching. When incorporated into a vehicle, the vibration-isolating bushing is fastened and secured to an attachment member in the condition that both edge faces of the inner cylinder are pinched with a bracket or another attachment member or only one edge face of the inner cylinder is brought into abutment on an attachment member with the inner cylinder inserted internally by a shank member such as a bolt. In the circumstances, because of the fact that the edge face(s) of the inner cylinder abutting on the attachment member is provided with the serration, the serration serves to bite into the attachment member upon incorporation into a vehicle, thereby preventing an undesired rotation of the inner cylinder both when incorporated in this way and subsequently when used. Due to quenching, the strength of the serration is enhanced and the buckling strength of the inner cylinder in the axial direction is also enhanced. Seeing that this serration and the aforementioned knurling can be simultaneously processed, it is advantageous to combine the serration for the purpose of preventing rotation of the inner cylinder and the knurling for the purpose of preventing the displacement.

DESCRIPTION OF THE PREFERRED EMBODIMENTS

Figure 1:
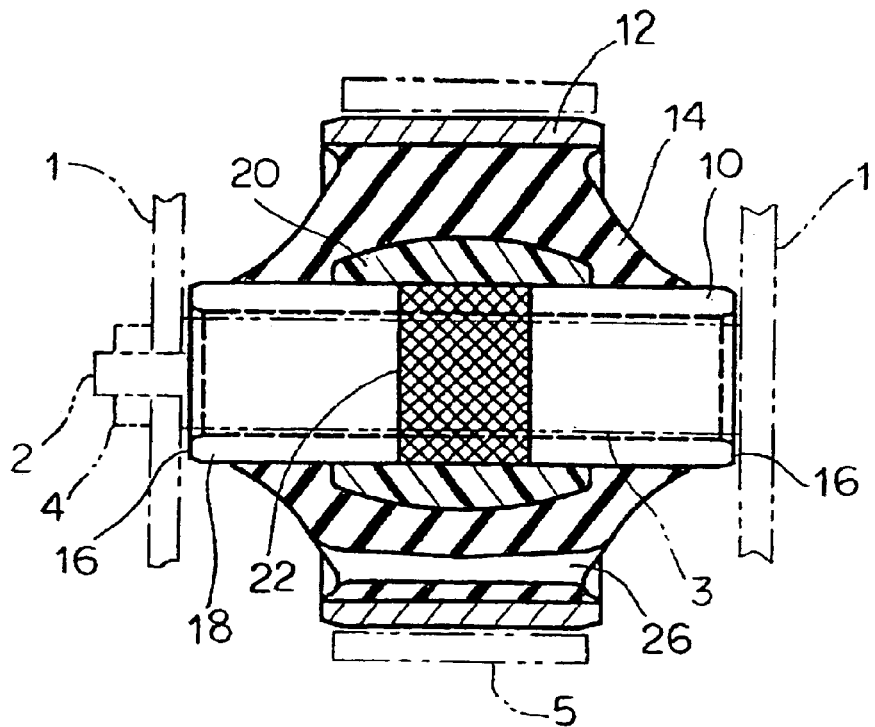
FIG. 1 is a sectional view of a vibration-isolating bushing pertaining to one embodiment of this invention.
Figure 2:
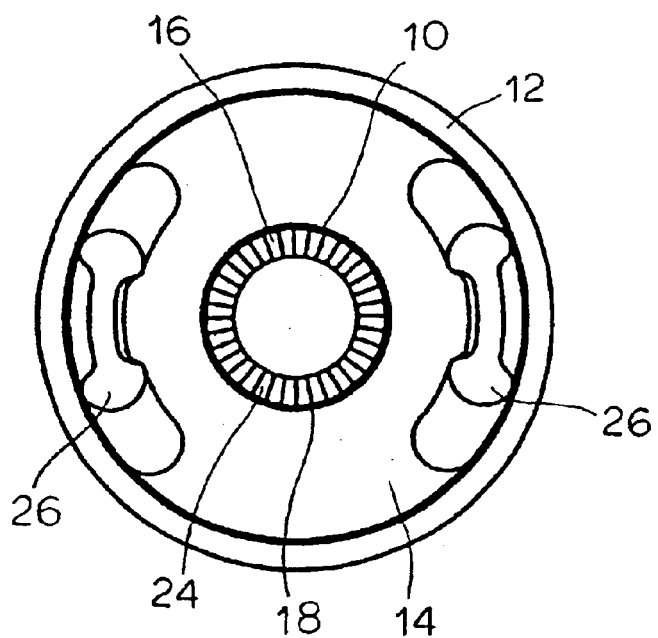
FIG. 2 is a side elevation of the aforesaid vibration-isolating bushing.

The invention will be hereinafter described by way of one embodiment with reference to the accompanying drawings. As shown in FIGS. 1 and 2, a bushing for a suspension, which is a vibration-isolating bushing relating to one embodiment of this invention, is made up of an inner cylinder 10, an outer cylinder 12 encircling the inner cylinder 10 and spaced apart a distance outwardly from the inner cylinder in an axially square direction thereof, and a ring-form rubber-like elastomer 14 interposed between the inner cylinder 10 and the outer cylinder 12. The inner cylinder 10 is secured to an attachment member 1 with its both edge faces 16, 16 pinched by means of the attachment member 1 such as a bracket by inserting a shank member 3 having a bolt 2 through the inner cylinder and fastening with a nut 4 whereas the outer cylinder 12 is press fitted in a cylinder element 5, which is the other attachment member to be secured thereto. Thereby the vibration-isolating bushing connects both attachment members 1,5 in a vibration-proof manner.

The inner cylinder 10 consists of a metal pipe 18 (e.g. steel) and an annular cover 20 of a synthetic resin disposed on an outer periphery of the pipe in its axially central area. On the other hand, the outer cylinder 12 is, for example, of steel assuming a cylindrical form, and has its axial length set to be equal to or more than that of the annular cover 20 provided on the inner cylinder 10. The rubber-like elastomer 14 is interposed between the inner cylinder 10 and the outer cylinder 12 by vulcanization molding so as to enwrap the annular cover 20. Owing to the effect of a thickness the annular cover 20 has, the rubber-like elastomer 14 is set to be thinner near the axial center thereof and thicker near both axial ends. In this way the rubber-like elastomer 14 is made thinner near the axial center whereby a spring constant in the axially square direction is set to be large whereas the rubber-like elastomer is made thicker near both axial ends whereby a spring constant in a prying direction is set to be small. The rubber-like elastomer 14 is further provided with through-holes 26 axially piercing through it in a peripherally predetermined range in order to set spring constants in three directions, namely the axial direction, the axially square direction and the prying direction at desired values.

The metal pipe 18 constituting the inner cylinder 10 is provided, in an axially central area, with a knurling 22 on its outer periphery and, at both axial edge surfaces 16, 16, with a serration 24, followed by hardening by quenching.

Here, the notching structure of the knurling 22 is not particularly limited if only the displacement of the annular cover 20 can be prevented, but a lattice-like mesh pattern is preferred, wherein a pitch between knurl tops is around 0.5 to 3.0 mm, more preferably on the order of 1.5 mm and a depth of knurls is around 0.3 to 1.5 mm, more preferably on the order of 0.6 mm. The width W1 of the knurling 22 is desired to be as wide as possible for the purpose of heightening the anchoring effect of the annular cover 20, but preferred to be about 0.6 to 0.8 time the width W2 of the annular cover 20, taking account of the fact that a too wide knurling beyond the annular cover 20 will cause the rubber to intrude in the knurling 22 when the rubber-like elastomer 14 is vulcanization molded (cf. FIG. 5).

Figure 4:
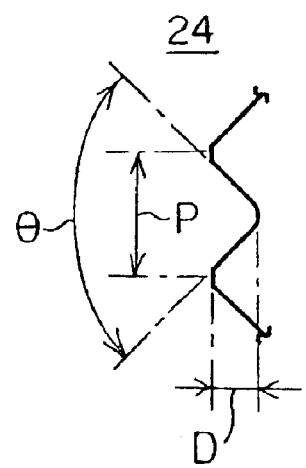
FIG. 4 is an enlarged sectional view showing a serration at an edge surface of the metal pipe.

The serration 24 consists, as illustrated in FIG. 2, of a plurality of radially extending furrows provided circumferentially at a predetermined pitch at an edge surface of the metal pipe 18, and as illustrated in an enlarged scale in FIG. 4, each land between the furrows assumes a ridge in cross-section. It is preferred that an angle θ made by adjacent slopes of each furrow wall be set to be about 60 to 120 degrees, more preferably on the order of 90 degrees, a pitch P between ridges to be about 0.5 to 3.0 mm, more preferably on the order of 1.5 mm, and a depth D to be about 0.3 to 1.5 mm, more preferably on the order of 0.6 mm.

The annular cover 20 is secured to the outer periphery of the metal pipe 18 inclusive of the knurling 22 by molding of a synthetic resin in a manner completely covering the knurling 22 of the metal pipe 18, thus bulging out in an axially square direction from the inner cylinder 10 proper in a nearly spherical form. The annular cover 20 can be molded of a variety of synthetic resins, but preferably is molded of a polyamide such as nylon 6, nylon 66, etc., polyethylene terephthalate, polybutylene terephthalate, polyphenylene sulfide, polyphenylene oxide, or the like.

The fabrication method of the vibration-isolating bushing comprises (1) a step of preparing the inner cylinder 10 and (2) a step of vulcanization molding the rubber-like elastomer 14 on the outer peripheral surface of the inner cylinder 10 thus prepared. Step (1) above further includes (1.1) a step of providing the outer periphery of the metal pipe 18 at its axially central part with the knurling 22, (1.2) a step of providing both axial edge faces 16, 16 with the serration 24, (1.3) a step of quenching the metal pipe 18 provided with the knurling 22 and the serration 24, and (1.4) a step of providing rigidly the annular cover 20 on the outer periphery of the metal pipe 18 thus quenched by fashioning of a synthetic resin in a mold.

As a means of providing the knurling 22 on the metal pipe 18 at Step (1.1) above, a knurling processing known per se can be applied, for example, by pressing a cylindrical knurling tool having notches on its outer peripheral face and hardened by quenching to the metal pipe 18, while rolling it. After the knurling processing, cleaning by kerosene oil is preferably conducted.

A known serration processing can be likewise applied as a means of providing the serration 24 on the metal pipe 18 at Step (1.2) above. For instance, the serration furrows may be formed on the edge surface of the metal pipe 18 with the aid of a shaving cutter.

Steps (1.1) and (1.2) can be simultaneously carried out. That is, while the metal pipe 18 is fixed to a fixing jig, the axially central part is subjected to knurling processing on its outer periphery on the one hand and the axial edge surface is subjected to a serration processing on the other hand, whereby the knurling 22 and the serration 24 can be formed at the same time. Thus it is preferred to conduct simultaneously both steps from the viewpoint of curtailing the processing time.

The quenching at Step (1.3) is conducted subsequently of the knurling processing and the serration processing. This is because it is difficult to apply a knurling processing and a serration processing to a hardened metal pipe. As a quenching method, a cementation (carburization) quenching is preferred, wherein after cementation, quenching treatment is applied. By the cementation quenching is meant a method wherein a heating treatment is conducted in a carburizing agent to increase the carbon quantity of the surface layer of the steel, and it is possible to adopt a known method as to the kind of carburizing agent and treatment conditions. A total depth of the hardened layer by cementation quenching is preferred to be of the order of 0.3 mm and a surface hardness after treatment in terms of Vickers hardness number according to JIS Z 2244 is preferred to be 550 to 850 HV1 (testing load of 9.8 N).

Figure 3:
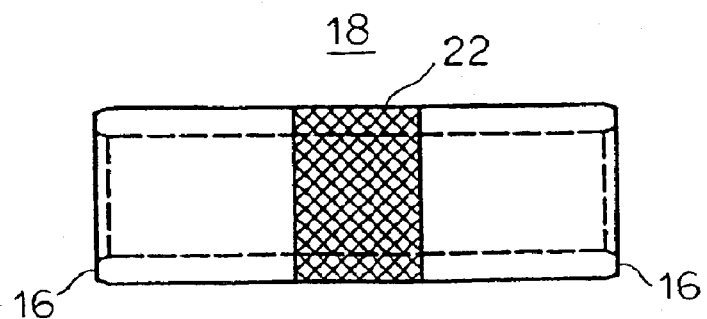
FIG. 3 is a front elevational view of a metal pipe constituting an inner cylinder of the vibration-isolating bushing.
Figure 5:
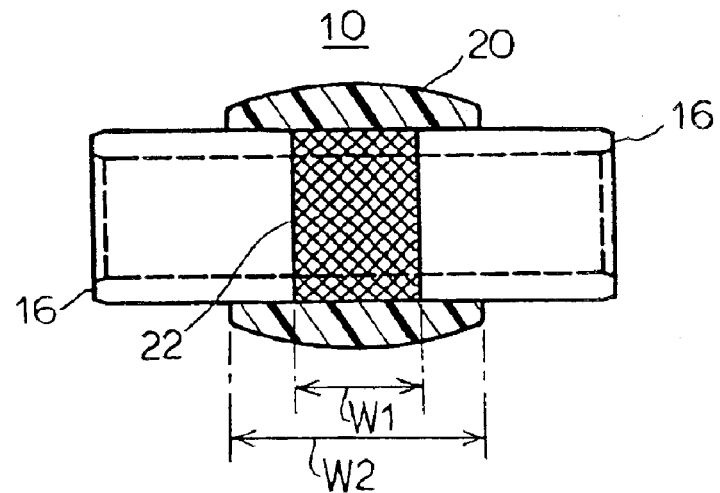
FIG. 5 is a front elevational view of the inner cylinder provided rigidly with an annular cover of a synthetic resin showing the cover in a cross-section.
Figure 6:
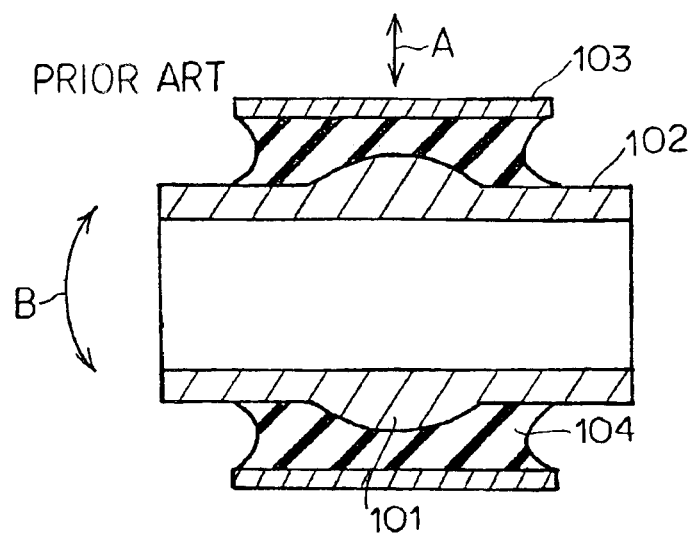
FIG. 6 is a sectional view of a first example of a conventional vibration-isolating bushing.
Figure 7:
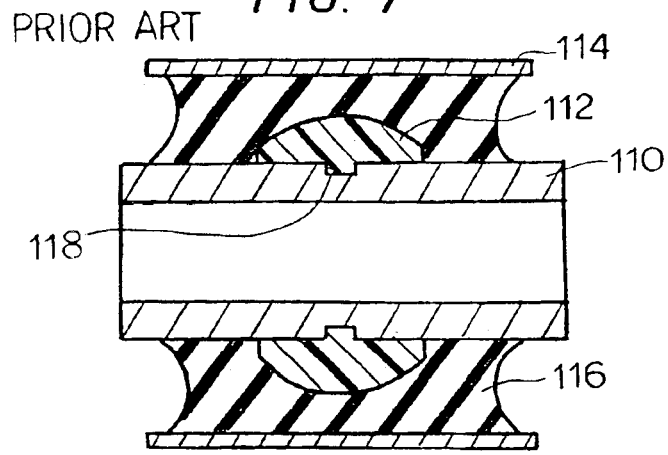
FIG. 7 is a sectional view of a second example of a conventional vibration-isolating bushing.
Figure 8:
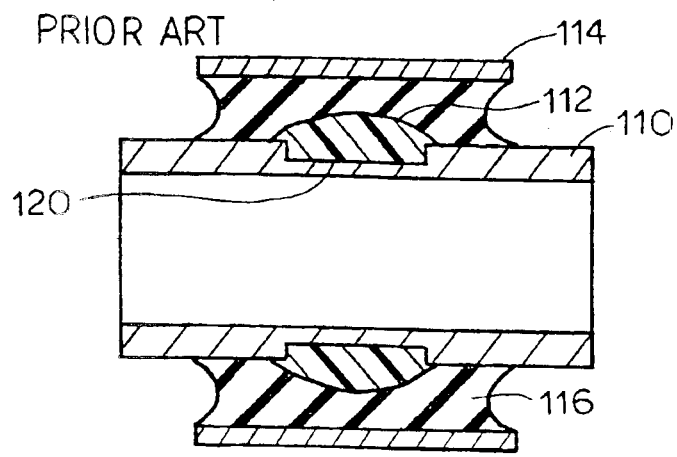
FIG. 8 is a sectional view of a third example of a conventional vibration-isolating bushing.

To the metal pipe 18 thus quenched (cf. FIG. 3) is provided the annular cover 20 at Step 1.4 (cf. FIG. 5). As a molding method for that, it is preferred to use injection molding, according to which the metal pipe 18 after quenching is set in a mold set not shown and a melted synthetic resin is poured into a cavity thereof to yield a molded product.

On the outer periphery of the inner cylinder 10 thus obtained, the rubber-like elastomer 14 is molded by vulcanization at Step 2. At that time, the rubber-like elastomer 14 may be molded by vulcanization in such a procedure that the inner cylinder 10 and the outer cylinder 12 are arranged in the mold set not shown so that the outer cylinder may surround the inner cylinder and a starting rubber material is poured between both cylinders 10, 12. In this case, the inner cylinder 10 and the outer cylinder 12 are integrally vulcanization-bonded by the rubber-like elastomer 14. Otherwise it is also possible to adopt another procedure, wherein only the inner cylinder 10 is arranged in the mold set not shown, a starting rubber material is poured there to mold the rubber-like elastomer 14 by vulcanization on the outer periphery of the inner cylinder 10, and then the outer cylinder 12 is externally inserted on the outer periphery of the molded rubber-like elastomer 14. Here, the outer cylinder 12 is not bonded by vulcanization to the rubber-like elastomer 14, but is rendered integral to the inner cylinder 10 and the rubber-like elastomer 14 inside it by reason of the external insertion.

According to the embodiment as described above, the annular cover 20 made of a synthetic resin is used as a bulge portion provided in a central part of the inner cylinder 10 and hence a weight reduction of the vibration-isolating bushing can be achieved. Further the use of the annular cover 20 of synthetic resin makes it possible to design its thickness freely, so that it is also possible to reduce the thickness of the rubber-like elastomer 14 at the axially central part thereof, and the design freedom of the spring constant in the axially square direction and the spring constant in the prying direction becomes high.

Due to the knurling 22 provided on the outer periphery of the metal pipe 18, it is possible to prevent any displacement of the annular cover 20 in the axial and rotational directions upon vulcanization molding of the rubber-like elastomer 14. In addition, since the preventive structure of displacement is achieved by the knurling 22 and the knurling processing is possible to conduct simultaneously with the serration processing as described above, the displacement can be prevented at a low cost without substantial increase in step number and the preventive structure is good also from an environmental aspect due to no production of cutting wastage. Further because of the provision of the axial edge face(s) of the metal pipe 18 with the serration 24, an undesired rotation of the inner cylinder 10 upon assembling to a vehicle and after assembling can be avoided and besides, the strength of the serration 24 is enhanced by quenching and a buckling strength in the axial direction of the inner cylinder 10 is also enhanced.

What is claimed is:

1. A method for manufacturing a vibration-isolating bushing which comprises (i) an inner cylinder having a bulge portion bulging out in a direction perpendicular to its axis in an axially central area, (ii) an outer cylinder disposed outside of the inner cylinder in a spaced relation, and (iii) an elastomer interposed between the inner cylinder and the outer cylinder, wherein the inner cylinder is composed of a metal pipe and an annular cover constituting the bulge portion provided on an outer periphery of an axially central part of the metal pipe, said method comprising the steps of:

providing a knurling on the outer periphery of the axially central part of the metal pipe;

providing a serration on at least one axial edge surface of the metal pipe;

quenching the metal pipe provided with the knurling and the serration;

securing the annular cover to the outer periphery of the quenched metal pipe inclusive of the knurling by molding of a synthetic resin; and vulcanization molding the elastomer at an outer periphery of the inner cylinder provided with the annular cover so as to enwrap the cover therein.

2. The method as set forth in claim 1, wherein the step of providing the knurling and the step of providing the serration are performed simultaneously.

3. The method as set forth in claim 1, wherein the quenching is cementation quenching.

4. The method as set forth in claim 1, wherein the knurling was formed in a lattice-like mesh pattern made of furrows having an angle of 60°–20° made by adjacent slopes of each furrow.

5. The method as set forth in claim 1, wherein the annular cover is formed in a barrel shape.

6. The method as set forth in claim 1, further comprising forming a through-hole in the elastomer in an axial direction in the vicinity of the outer cylinder.

7. The method as set forth in claim 1, wherein a depth of the knurling after quenching and a depth of the serration after quenching are about 0.3 mm, respectively.

8. The method as set forth in claim 1, wherein the quenched metal pipe has a surface having Vickers hardness of 550 to 850 HV1 as measured on testing load of 9.8 N.

* * * * *

UNITED STATES PATENT AND TRADEMARK OFFICE
CERTIFICATE OF CORRECTION

PATENT NO. : 6,899,323 B2
DATED : May 31, 2005
INVENTOR(S) : Seiya Takeshita et al.

It is certified that error appears in the above-identified patent and that said Letters Patent is hereby corrected as shown below:

<u>Column 7,</u>
Line 8, delete "60º-20º" and insert -- 60º-120º --.

Signed and Sealed this

Fourth Day of October, 2005

JON W. DUDAS
*Director of the United States Patent and Trademark Office*